United States Patent Office 3,502,649
Patented Mar. 24, 1970

3,502,649
N(6) SUBSTITUTED ADENOSINE DERIVATIVES
Max Thiel, Mannheim, and Wolfgang Kampe, Kurt Stach, Wolfgang Schaumann, and Karl Dietmann, Mannheim-Waldhof, Germany, assignors to Boehringer Mannheim G.m.b.H., Antsgeich, Mannheim, Germany, a corporation of Germany
No Drawing. Filed Mar. 22, 1967, Ser. No. 625,001
Claims priority, application Germany, May 7, 1966, B 87,038
Int. Cl. C07d 51/54
U.S. Cl. 260—211.5    7 Claims

ABSTRACT OF THE DISCLOSURE

Novel N(6)-substituted adenosine derivatives which are suitable for use in the treatment of cardiac and circulatory disturbances having the following structural formula:

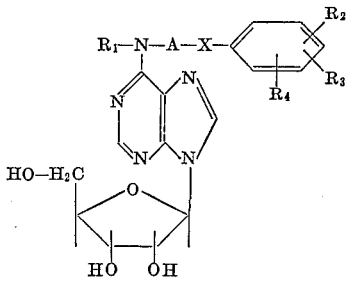

wherein $R_1$ is hydrogen or lower alkyl, $R_2$, $R_3$ and $R_4$ which may be the same or different are hydrogen, halogen, hydroxyl, alkyl, haloalkyl, alkoxy, aryloxy, acyloxy, or alkylmercapto, A is alkylene containing 2 to 5 carbon atoms or alkylene substituted by hydroxyl or acyloxy and X is a valency bond, an oxygen or sulfur atom or the group —N—R' wherein R' is hydrogen, lower alkyl or acyl.

---

The present invention relates to adenosine derivatives and more particularly relates to N(6)-substituted adenosine derivatives, therapeutic compositions containing such derivatives as active ingredient and to a method of using such adenosine derivatives.

The novel adenosine derivatives according to the present invention are compounds of the formula:

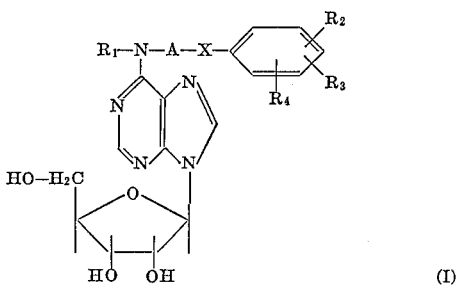

wherein $R_1$ is hydrogen or lower alkyl, $R_2$, $R_3$ and $R_4$, which may be the same or different, are each hydrogen, halogen, hydroxyl, alkyl, haloalkyl, alkoxy, aryloxy, acyloxy or alkylmercapto, A is straight or branched chain alkylene containing 2 to 5 carbon atoms or alkylene substituted by hydroxyl or acyloxy, and X is a valency bond, an oxygen or sulfur atom, or the group N—R', wherein R' is hydrogen, lower alkyl or acyl.

In accordance with the invention, it has now been found that the new N(6)-substituted adenosine derivatives of Formula I exhibit particularly interesting cardiac and circulatory pharmacological activities.

The new compounds according to the present invention can be prepared, for example, by reacting, according to the conventional methods, a 6-halopurine-riboside of the formula:

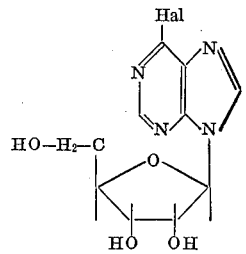

wherein Hal is halogen, with an amine of the general formula:

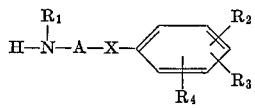

wherein $R_1$, $R_2$, $R_3$, $R_4$, A and X have the above designated meanings. In the aforesaid reaction, if desired or advantageous, the hydroxyl groups of the ribose moiety can be temporarily blocked by groups which are easily split off after the condensation.

As starting compounds (II), there are preferably used the chloro and bromo derivatives. These compounds have been described, for example, in Coll. Czech. Chem. Comm., 30, 1880/1965 and in Biochemical Preparations, 10, 148/1963.

For carrying out the process according to the present invention, the reaction components are advantageously heated in a suitable inert solvent, preferably in a higher boiling alcohol, such as isopropanol or butanol, or in tetrahydrofuran. However, the reaction mixture can also be allowed to stand for several days at room temperature if an equimolar amount of a tertiary amine, preferably triethylamine, is added to the mixture.

If it is desired to temporarily block the hydroxyl groups in the compounds of Formula II, then there are used the protective groups conventional in sugar chemistry. For this purpose, there can be used, for example, acyl radicals, preferably acetyl or benzoyl radicals, or there can also be used ketals, for example, the 2',3'-isopropylidene compounds, which, after the condensation reaction has taken place, can easily be converted into the free 2',3'-dihydroxy compounds with acids. On the other hand, however, when acyl radicals are used as the protective groups, these are subsequently split off by the action of alkalis.

The invention will appear more fully from the examples which follow. These examples are set forth by way of illustration only, and it will be understood that the invention is not to be construed as limited in spirit or in scope by the details contained therein, as many modifications in material and methods will be apparent from this disclosure to those skilled in the art.

EXAMPLE 1

N(6)-β-phenethyl-adenosine 6 g. tribenzoyl-6-chloro-9-(β-D-ribosyl)-purine and 2.4 g. β-phenethylamine in 100 ml. of isopropanol were boiled under reflux for 4 hours. The reaction mixture was then evaporated in a vacuum, the residue mixed with chloroform and filtered using suction. Following washing with an aqueous solution of sodium bicarbonate and with water, the chloroform solution was evaporated. The residue remaining was dissolved in 200 ml. methanol and mixed with 3 ml. 1 N sodium methylate solution. The resulting reaction mixture was boiled under reflux, conentrated in a vacuum to half its volume and cooled. The precipitate obtained was filtered off with suction and washed with water, methanol and ether. There were obtained 1.8 g. (65% of theory) N(6)-β-phenethyl-adenoine having a melting point of 167–168° C.

EXAMPLE 2

N(6)-(3-phenyl-propyl-2)-adenosine

*Method I.*—27 g. triacetyl-6-chloro-9-(β-D-ribosyl)-purine and 27 g. D,L-3-phenyl-2-aminopropane in 400 ml. isopropanol were boiled under reflux for 5 hours. After working up the reaction mixture as set out in Example 1, there were obtained 9.8 g. (39% of theory) N(6)-(3-phenyl-propyl-2)-adenosine having a melting point of 141–142° C.

*Method II.*—1.5 g. 6-chloro-9-(β-D-ribosyl)-purine, 1.5 g. D,L-3-phenyl-2-aminopropane and 25 ml. butanol were boiled under reflux for 8 hours. The reaction mixture was then evaporated in a vacuum and the residue shaken up with chloroform and water. The chloroform phase was separated off and evaporated to dryness and the residue triturated with methanol/ethyl acetate and filtered using suction. In this manner, there were obtained 0.7 g. (35% of theory) N(6)-(3-phenyl-propyl-2)-adenosine having a melting point of 140–142° C.

EXAMPLE 3

N(6)-(3-phenyl-propyl-2)-N(6)-methyl-adenosine

A mixture of 8.2 g. triacetyl-6-chloro-9-(β-D-ribosyl)-purine, 120 ml. isopropanol and 9 g. D,L-N-(3-phenyl-propyl-2)-methylamine was boiled under reflux for 4 hours. The resulting reaction mixture was then evaporated in a vacuum and the residue extracted with ether and water. The ethereal phase was then separated off and evaporated. The residue of the ether extract was taken up with methanol, mixed with 8 ml. 1 N sodium methylate solution in methanol and boiled under reflux for 2 hours. The reaction solution was thereafter evaporated in a vacuum and the residue taken up with ether. After shaking out the ethereal solution with water, it was dried and evaporated. The residue crystallized upon trituration with isopropanol. The material thereby obtained was recrystallized from ethyl acetate, with the use of activated charcoal. There were obtained 4.4 g. (55% theory) N(6)-(3-phenyl-propyl-2)-N(6)-methyl-adenosine having a melting point of 177° C.

EXAMPLE 4

N(6)-(3-m-cresyloxy-2-hydroxy-propyl)-adenosine

Starting with 4.1 g. triacetyl-6-chloro-9-(β-D-ribosyl)-purine and 4.5 g. 3-m-cresyloxy-2-hydroxy-propylamine, and following the procedure described in Example 3, there was obtained a crude product which was recrystallized from methanol. There were obtained 2 g. (46% of theory) N(6)-(3-m-cresyloxy-2-hydroxy-propyl)-adenosine having melting point of 104–106° C.

EXAMPLE 5

N(6)-[3-(3-chlorophenoxy)-2-hydroxy-propyl]-adenosine

There were obtained, from 4.1 g. triacetyl-6-chloro-9-β-D-ribosyl)-purine and 5 g. 3-(3-chlorophenoxy)-2-hydroxy-propylamine, by a procedure analogous to that described in Example 3, 2.4 g. (53.5% of theory) N(6)-3-(3-chlorophenoxy)-2-hydroxy-propyl]-adenosine having a melting point of 101–103° C.

EXAMPLE 6

N(6)-(L-(+)-threo-1-hydroxy-1-phenyl-propyl-2)-N(6)-methyl-adenosine 4.1 g. triacetyl-6-chloro-9-(β-D-ribofuranosyl)-purine, 2.5 g. L-(+)-threo-1-hydroxy-1-phenyl-2-aminomethyl-propane (d-ψ-ephedrine) and 2.0 g. triethylamine were dissolved in 50 ml. isopropanol and boiled under reflux for hours. The reaction mixture was then evaporated in a vacuum and the residue shaken up with ether and water. The ethereal phase was separated off, dried and evaporated and the residue taken up with 50 ml. methanol saturated with ammonia. After standing overnight at room temperature, the excess ammonia was boiled off, the solution treated with activated charcoal and evaporated. The residue crystallized upon triturating with ether. The product was then recrystallized from methanol or ethanol. There were obtained 2.6 g. (62% of theory) N(6)-(L-(+)-threo - 1 - hydroxy-1-phenyl-propyl-2)-N(6)methyl-adenosine having a melting point of 204–206° C.

EXAMPLE 7

N(6)-(D,L-3-phenoxy-2-hydroxy-propyl-1)-adenosine

A solution of 4.1 g. triacetyl-6-chloro-9(β-D-ribofuranosyl)-purine, 3.35 g. D,L-2-hydroxy-3-phenoxy-propylamine and 2.02 g. triethylamine in 50 ml. isopropanol was boiled under reflux for 2 hours. The reaction mixture was then evaporated in a vacuum and the residue taken up with chloroform. The chloroform phase was washed several times with water, and then dried and evaporated. The further working up was carried out in a manner analogous to the procedure described in Example 6. There were obtained 1.1 g. (26% of theory) N(6)-(D,L-3-phenoxy-2-hydroxy-propyl-1)-adenosine in the form of colorless needles having a melting point of 102–104° C.

EXAMPLE 8

N(6)-(L-(+)-threo-1-hydroxy-1-phenyl-propyl-2)-adenosine

From 4.1 g. triacetyl-6-chloro-9-(β-D-ribofuranosyl)-purine, 2.3 g. L-(+)-threo-1-hydroxy-1-phenyl-2-aminopropane (d-nor-ψ-ephedrine) and 2.02 g. triethylamine, there was obtained, in a manner analogous to that described in Example 6, a crude product which was recrystallized from ethyl acetate, with the addition of activated charcoal. There were thus obtained 1.6 g. (40% of theory) N(6)-(L-(+)-threo-1-hydroxy-1-phenyl-propyl-2)-adenosine having a melting point of 98–100° C.

EXAMPLE 9

N(6)-(β-3,4,5-trimethoxy-phenyl)-ethyl-adenosine

There were obtained from 3.2 g. triacetyl-6-chloro-9-(β-D-ribofuranosyl)-purine, 3.0 g. β-(3,4,5-trimethoxy-phenyl)-ethylamine and 3.55 g. triethylamine, and following a method analogous to that described in Example 6, 1.6 g. (45% of theory) N(6)-(β-3,4,5-trimethoxy-phenyl)-ethyl-adenosine having a melting point of 84–86° C.

EXAMPLE 10

N(6)-(D,L-threo-1-hydroxy-1-phenyl-propyl-2)-adenosine

From 4.1 g. triacetyl-6-chloro-9-(β-D-ribofuranosyl)-purine, 2.26 g. D,L-threo-1-hydroxy-1-phenyl-2-aminopropane (d,l-norpseudoephedrine) and 2.02 g. triethylamine, there was obtained, by proceeding in a manner analogous to that described in Example 6, a crude product which was purified by preparative thin layer chromatography on silica gel plates. There were obtained 1.3 g. (32% of theory) N(6)-(D,L-threo-1-hydroxy-1-phenyl-propyl-2)-adenosine having a melting point of 75–77° C.

EXAMPLE 11

N(6)-(D,L-erythro-1-hydroxy-1-phenyl-propyl-2)-adenosine

From 6.2 g. triacetyl-6-chloro-9-(β-D-ribofuranosyl)-purine, 3,4 g. D,L-erythro-1-hydroxy-1-phenyl-2-aminopropane (d,l-norephedrine) and 3.03 g. triethylamine, there were obtained, on following a procedure similar to that described in Example 6, and after working up and purification by preparative thin layer chromatography, 3.2 g. (53% of theory) N(6)-(D,L-erythro-1-hydroxy-1- phenyl-propyl-2)-adenosine having a melting point of 82–84° C.

EXAMPLE 12

N(6)-D-(—)-erythro-1-hydroxy-1-phenyl-propyl-2)-N(6)-methyl-adenosine 4.1 g. triacetyl-6-chloro-9-(β-D-ribofuranosyl)-purine, 2.5 g. D-(—)-erythro-1-hydroxy-1-phenyl-2-methylamino-propane (1-ephedrine) and 2.02 g. triethylamine in 50 ml. isopropanol were boiled under reflux for 4 hours. After working up the reaction mixture in a manner analogous to that described in Example 6 and purifying the resultant material by preparative thin layer chromatography, there were obtained 1.4 g. (33% of theory) N(6)-(D-(—)-erythro - 1 - hydroxy - 1 - phenyl - propyl-2)-N(6)-methyl-adenosine having a melting point of 75–80° C. (decomp.).

EXAMPLE 13

N(6) - (D,L - threo - 1 - hydroxy - 1 - phenyl - propyl-2)-N(6)-methyl-adenosine 4.1 g. triacetyl-6-chloro-9-(β-D-ribofuranosyl)-purine, 2.5 g. D,L-threo-1-hydroxy - 1 - phenyl - 2 - methylaminopropane (d,l-pseudoephedrine) and 2.02 g. triethylamine in 50 ml. isopropanol were boiled under reflux for 3 hours. The reaction mixture was thereafter worked up in a manner analogous to that described in Example 6 and the product obtained recrystallized from water. There were obtained 1.3 g. (31% of theory) N(6)-(D,L-threo-1-hydroxy-1-phenyl - propyl - 2) - N(6)methyl-adenosine having a melting point of 194–196° C.

EXAMPLE 14

N(6) - (D,L - erythro - 1 - hydroxy - 1 - phenyl - propyl-2)-N(6)-methyl-adenosine 2.06 g. triacetyl-6-chloro-9-(β-D-ribofuranosyl)-purine, 2.5 g. D,L-erythro-1-hydroxy-1-phenyl-2-methylaminopropane (d,l-ephedrine) and 1.01 g. triethylamine in 25 ml. isopropanol were boiled under reflux for 4 hours. After working up the reaction mixture in a manner analogous to that described in Example 6, the crude product which was obtained was purified by preparative thin layer chromatography. There were recovered 0.9 g. (43% of theory) N(6) - (D,L-erythro-1-hydroxy-1-phenyl-propyl-2)-methyl-adenosine having a melting point of 105–108° C.

EXAMPLE 15

N(6)-(D,L-1-phenyl-butyl-3)-adenosine 4.1 g. triacetyl-6-chloro-9-(β-D-ribofuranosyl)-purine, 4.5 g. D,L-1-phenyl-3-aminobutane and 2.02 g. triethylamine in 50 ml. isopropanol were boiled under reflux for 8 hours. After working up the reaction mixture by following a procedure analogous to that described in Example 6, the crude product obtained was purified by preparative thin layer chromatography and recrystallized from methanol. There were obtained 1.2 g. (31% of theory) N(6)-(D,L-1-phenyl-butyl-3)-adenosine having a melting point of 98–100° C.

EXAMPLE 16

N(6)-(D,L-1-phenoxypropyl-2)-adenosine 4.1 g. triacetyl-6-chloro-9-(β-D-ribofuranosyl)-purine, 2.3 g. D,L-1-phenoxy-2-aminopropane and 2.02 g. triethylamine in 50 ml. isopropanol were boiled under reflux for 3 hours. After working up the reaction mixture in a manner analogous to that described in Example 6, the crude product obtained was purified by preparative thin layer chromatography. There were thereby obtained 1.6 g. (40% of theory) N(6)-(D,L-1-phenoxypropyl-2)-adenosine having a melting point of 86–89° C. (decomp.).

EXAMPLE 17

N(6)-(D,L-1-phenyl-ethyl)-adenosine 4.1 g. triacetyl-6-chloro-9-(β-D-ribofuranosyl)-purine, 1.8 g. D,L-1-phenyl-ethylamine and 2.02 g. triethylamine in 50 ml. isopropanol were boiled under reflux for 3 hours. After working up the reaction mixture, following a method analogous to that described in Example 6, the crude product obtained was purified by preparative thin layer chromatography. There were obtained 2.1 g. (57% of theory) N(6)-(D,L-1-phenyl-ethyl)-adenosine having a melting point of 97–99° C. (decomp.).

EXAMPLE 18

N(6)-(D-3-phenyl-propyl-2)-adenosine 8.2 g. triacetyl-6-chloro-9-(β-D-ribosyl)-purine and 8.1 g. D-3-phenyl-2-aminopropane in 100 ml. isopropanol were boiled under reflux for 2 hours. The reaction mixture was evaporated in a vacuum and the residue extracted with ether and water. The ethereal phase was then separated off and evaporated and the residue remaining dissolved in 100 ml. methanol. 5 ml. 1 N sodium methylate solution were added thereto and the solution boiled for 1 hour. It was then evaporated in a vacuum and shaken up with ether and water. The ethereal layer was discarded and the aqueous phase extracted with chloroform. The residue obtained following evaporation of the chloroform was dissolved in ethanol, mixed with activated charcoal, filtered and again evaporated. The evaporation residue thereby obtained crystallized upon triturating with isopropanol/ethyl acetate. There were recovered 2.5 g. (33% of theory) N(6)-(D-3-phenyl-propyl-2)-adenosine having a melting point of 162–163° C.; $[\alpha]_D^{20}=+18.2°$ (dimethyl formamide).

EXAMPLE 19

N(6)-(D-threo-1-phenyl-1,3-dihydroxy-propyl-2)-adenosine 8.3 g. triacetyl-6-chloro-9-(β-D-ribosyl)-purine, 3.7 g. D-threo-1-phenyl-1,3-dihydroxy-propyl-2-amine, 3.9 g. diisopropyl-ethylamine and 100 ml. n-butanol were boiled under reflux for 10 hours. The reaction mixture was evaporated in a vacuum, the residue dissolved in 100 ml. methanol, 10 ml. 2 N sodium methylate solution added thereto and the resulting mixture boiled under reflux for 2 hours. Following evaporation of the reaction mixture in a vacuum, the residue was extracted with water and chloroform, the slowly crystallizing precipitate filtered off with suction and recrystallized from isopropanol/ether, with the use of activated charcoal. There were obtained 2.8 g. (32% of theory) N(6)-(D-threo-1-phenyl-1,3-dihydroxy-propyl-2)-adenosine having a melting point of 208–209° C.; $[\alpha]_D^{20}=-155.2°$ (dimethyl formamide).

EXAMPLE 20

N(6)-(L-threo-1-phenyl-1,3-dihydroxy-propyl-2)-adenosine 8.3 g. triacetyl-6-chloro-9-(β-D-ribosyl)-purine, 3.7 g. L-threo-1-phenyl-1,3-dihydroxy-propyl-2-amine, 4 g. diisopropyl-ethylamine and 100 ml. n-butanol were boiled under reflux for 3 hours. The reaction mixture was thereafter evaporated in a vacuum, the residue dissolved in 100 ml. methanol, mixed with 10 ml. 1 N sodium methylate solution and boiled for 1 hour. The reaction mixture was thereafter evaporated in a vacuum and the residue shaken up with chloroform and water. The aqueous phase was evaporated, the residue dissolved in hot ethanol, filtered and, after cooling, ether added thereto. The pricipitate which formed was filtered off with suction and dried. There were obtained 3 g. (36% of theory) N(6)-(L-threo-1-phenyl-1,3-dihydroxy-propyl-2)-adenosine having a melting point of 83–85° C.; $[\alpha]_D^{20}=+42.3°$ (dimethyl formamide).

EXAMPLE 21

N(6)-(D-(—)-erythro-1-hydroxy-1-phenyl-propyl-2)-adenosine 6.2 g. triacetyl-6-chloro-9-(β-D-ribofuranosyl)-purine, 3.4 g. D-(—)-erythro-1-hydroxy-1-phenyl-2-amino-propane (1-norephedrine) and 3.03 g. triethylamine in 50 ml. isopropanol were boiled under reflux for 3 hours. After working up the reaction mixture by a procedure analogous to that described in Example 6, the crude product obtained was purified by preparative thin layer chromatography and recrystallized from acetonitrile. There were obtained 3.2 g. (53% of theory) N(6)-(D-(—)-erythro-1-hydroxy-1-phenyl-propyl-2) - adenosine having a melting point of 178–180° C. (decomp.).

In order to establish the effectiveness of the compounds in accordance with the invention as therapeutic agents exerting an effect on the cardiac and circulatory systems, the applicants carried out a series of tests, the details and significance of which are set out hereinafter.

Adenosine on intravenous administration in mammals and humans produces a vaso-dilation. In particular this effect is noticeable in the coronary vascular system wherein a marked increase in blood circulation results from the vasodilation produced by administration of adenosine (Berne, Blackmon and Gardner, J. Clin. Invest. 36, 1101 [1957]). However, due to the rapid deamination of adenosine, this effect is only transient. N(6)-substituted derivatives of adenosine have been found to exert a marked coronary vasodilating effect of high specificity but in contrast to adenosine, the effect is a prolonged one. In order to compare the effectiveness of the novel N(6)-substituted adenosine derivatives, on the coronary blood circulation, the applicants have selected N(6)-methyl adenosine which has been described in the literature (Bredereck, Haas u. Martini, Chem. Ber. 81, 307 [1948]) as the comparison compound.

An increased blood circulation in the coronary system, provided that there are no significant changes in the myocardial oxygen consumption, results in a reciprocal decrease of the coronary arteriovenous oxygen difference. This decrease in extraction of oxygen from the blood leads to an additional supply of oxygen and namely, that an improvement in the oxygen supply to the myocardium which is the ultimate aim sought to be achieved with all coronary dilating agents.

For the purpose of obtaining an exact basis for evaluating the results of the procedures involved, the decrease in coronary arteriovenous oxygen difference (at the time of the maximum effect) has been reported in volume percent in the table as compared to the starting value. The greater the value reported the more significant was the coronary oxygen supply increase.

The procedures were carried out using 28 alert unanesthetized dogs, each weighing between 12 and 16 kg. The procedure of Rayford, Huvos and Gregg, Proc. Soc. exp. Biol. Med. 113, 876 [1963] were followed, catheters having been implanted surgically into the sinus coronarius, the aorta and the vena cava of the animals. It was thus made possible to photometrically determine the coronary arteriovenous saturation difference (Brinkman, Arch. Chir. Neerl. 1, 177 [1949]) and from the actual hemoglobin values obtained to convert the values into the corresponding volume percents. The compounds were administered intravenously in the amounts indicated in 1 ml. of a 5 percent Lutrol-9-solution (liquid polyethylene oxide, molecular weight about 400, BASF-Ludwigshafen) in 5.5 percent aqueous glucose.

The following compounds were employed in the experimental procedures:

A—N(6)-methyl-adenosine.
B—N(6)-β-phenethyl-adenosine.
C—N(6)-(3-phenyl-propyl-2)-adenosine.
D—N(6)-(3-phenyl-propyl-2)-N(6)-methyl-adenosine.
E—N(6)-(D-3-phenyl-propyl-2)-adenosine.
F—N(6)-(3-m-cresyloxy-2-hydroxy-propyl)-adenosine.
G—N(6)-[3-(3-chlorophenoxy)-2-hydroxy-propyl]-adenosine.
H—N(6)-(D,L-erythro-1-hydroxy-1-phenyl-propyl-2)-N(6)-methyl-adenosine.
I—N(6)-D-(—)-erythro-1-hydroxy-1-phenyl-propyl-2)-N(6)-methyl-adenosine.
J—N(6)-(D,L-threo-1-hydroxy-1-phenyl-propyl-2)-N(6)-methyl-adenosine.
K—N(6)-(L-(+)-threo-1-hydroxy-1-phenyl-propyl-2)-N(6)-methyl-adenosine.
L—N(6)-(D,L-erythro-1-hydroxy-1-phenyl-propyl-2)-adenosine.
M—N(6)-(D,L-threo-1-hydroxy-1-phenyl-propyl-2)-adenosine.
N—N(6)-(L-(+)threo-1-hydroxy-1-phenyl-propyl-2)-adenosine.
O—N(6)-(D,L-3-phenoxy-2-hydroxy-propyl-1)-adenosine.
P—N(6)-(β-3,4,5-trimethoxy-phenyl)-ethyl-adenosine.
Q—N(6)-(D,L-1-phenylbutyl-3)-adenosine.
R—N(6)-(D,L-1-phenoxy-propyl-2)-adenosine.
S—N(6)-(D-(—)-erythro-1-hydroxy-1-phenyl-propyl-2)-adenosine.

The results of the experimental procedures are set out in the following table.

TABLE

| Compound | Doses, mg./kg. i.v. | Decrease of the coronary $O_2$-depletion (at maximum effect) in vol. percent as compared to the starting values |
|---|---|---|
| A | 0.4 | [1] ±0.0 |
|   | 2.0 | [1] ±0.0 |
| B | 0.4 | 5.6 |
| C | 0.1 | 7.2 |
| D | 0.4 | 1.3 |
| E | 0.4 | 1.6 |
| F | 0.4 | 4.4 |
| G | 0.4 | 1.9 |
| H | 0.4 | 0.9 |
| I | 0.4 | 0.5 |
| J | 0.4 | 1.1 |
| K | 0.4 | 0.2 |
| L | 0.2 | 8.1 |
| M | 0.2 | 8.4 |
| N | 0.2 | 5.9 |
| O | 0.4 | 3.1 |
| P | 0.2 | 9.6 |
| Q | 0.4 | 2.3 |
| R | 0.4 | 3.7 |
| S | 0.4 | 7.8 |

[1] Without effect.

From the table, it can be seen that the compounds, in accordance with the invention, constitute highly valuable therapeutic agents having marked coronary dilating properties in contrast to the known compound which is substantially ineffective in a dosage range of 0.4 to 2.0 mg./kg.

As previously indicated, the adenosine derivatives of this invention are readily adapted to therapeutic use as cardio and circulatory agents. The toxicity of the compounds of the invention has been found to be quite low or substantially non-existent when they are administered in amounts that are sufficient to achieve the desired therapeutic effects. Moreover, no other pharmacological side effects have been observed to occur as a result of their administration.

In accordance with the method of treatment of the present invention, the compounds can be given via the oral route. However, the compounds can also be administered as parenterals in the form of their solutions or suspensions. The compounds can be administered either alone and/or preferably in combination with a pharmaceutically acceptable carrier, and such administration can be carried out in both single and multiple dosages. More particularly, the compounds of this invention can be administered in a wide variety of different dosage forms wherein they are combined with various pharmaceutically acceptable inert carriers in the form of tablets, capsules, dragees, powders, aqueous suspensions, solutions, and the like. Such carriers include solid diluents or fillers, liquid aqueous media and various non-toxic organic solvents, etc. In general, the therapeutically effective compounds are present in such dosage forms at concentration levels ranging from about 0.01 to about 90% by weight of the total composition, i.e., in amounts which are sufficient to provide the desired unit dosage.

In dosage unit form, the compounds as set out herein are used in amounts of from 0.1–50 mg., preferably 0.5–10 mg., active ingredient per dosage unit. Preferably, the compositions are compounded so that for parenteral administration, 0.5–5 mg. of active compound/dosage unit is present and for oral administration 2–10 mg. of compound/dosage unit.

We claim:
1. An adenosine derivative of the formula:

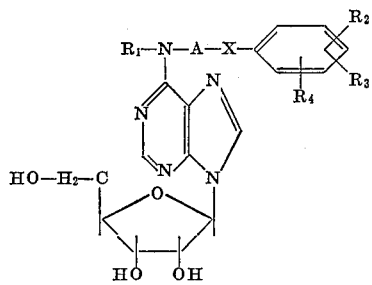

wherein $R_1$ represents a member selected from the group consisting of hydrogen and lower alkyl, $R_2$, $R_3$ and $R_4$ are each a member selected from the group consisting of hydrogen, chlorine, hydroxy, lower alkyl and lower alkoxy, A is a member selected from the group consisting of alkylene containing 2 to 5 carbon atoms and hydroxy substituted alkylene containing 2 to 5 carbon atoms and X is a valency bond or oxygen.

2. An adenosine derivative according to claim 1 N(6)-(3-phenyl-propyl-2)-adenosine.
3. An adenosine derivative according to claim 1 N(6)-(D,L-erythro-1-hydroxy-1-phenylpropyl-2)-adenosine.
4. An adenosine derivative according to claim 1 N(6)-(D,L-threo-1-hydroxy-1-phenylpropyl-2)-adenosine.
5. An adenosine derivative according to claim 1 N(6)-(L-(+)-threo-1-hydroxy-1-phenylpropyl-2)-adenosine.
6. An adenosine derivative according to claim 1 N(6)-(β-3,4,5-trimethoxy-phenyl)-ethyladenosine.
7. An adenosine derivative according to claim 1 N(6)-(D - (−) - erythro-1-hydroxy-1-phenylpropyl-2) - adenosine.

References Cited
UNITED STATES PATENTS 2,881,164  4/1959  Kissman et al. _____ 260—211.5
3,014,900  12/1961  Schroeder _____ 260—211.5

LEWIS GOTTS, Primary Examiner
J. R. BROWN, Assistant Examiner

U.S. Cl. X.R.
424—180